(12) United States Patent
Takeuchi et al.

(10) Patent No.: US 9,744,957 B2
(45) Date of Patent: Aug. 29, 2017

(54) BRAKING DEVICE FOR VEHICLE

(71) Applicants: ADVICS CO., LTD., Kariya, Aichi-pref. (JP); TOYOTA JIDOSHA KABUSHIKI KAISHA, Toyota-shi, Aichi-ken (JP)

(72) Inventors: Kiyohito Takeuchi, Nagoya (JP); Yosuke Yamasoe, Kariya (JP); Yoshio Masuda, Anjyo (JP); Masaki Ninoyu, Obu (JP); Kiyoyuki Uchida, Konan (JP); Yusuke Kamiya, Okazaki (JP); Masaaki Komazawa, Miyoshi (JP); Akira Sakai, Toyota (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 209 days.

(21) Appl. No.: 14/766,077

(22) PCT Filed: Jan. 31, 2014

(86) PCT No.: PCT/JP2014/052291
§ 371 (c)(1),
(2) Date: Aug. 5, 2015

(87) PCT Pub. No.: WO2014/125941
PCT Pub. Date: Aug. 21, 2014

(65) Prior Publication Data
US 2016/0001755 A1 Jan. 7, 2016

(30) Foreign Application Priority Data
Feb. 13, 2013 (JP) .................................. 2013-025840

(51) Int. Cl.
*B60T 13/12* (2006.01)
*B60T 13/14* (2006.01)
(Continued)

(52) U.S. Cl.
CPC ............ *B60T 13/662* (2013.01); *B60T 7/042* (2013.01); *B60T 8/4077* (2013.01);
(Continued)

(58) Field of Classification Search
CPC . B60T 8/17; B60T 13/12; B60T 13/14; B60T 13/146; B60T 13/148; B60T 13/161–13/162
See application file for complete search history.

(56) References Cited

U.S. PATENT DOCUMENTS 4,657,312 A * 4/1987 Burgdorf ................ B60T 8/885
303/122.11
5,112,115 A * 5/1992 Willmann ................. B60T 8/34
188/358
(Continued)

FOREIGN PATENT DOCUMENTS

| JP | 2007-038698 A | 2/2007 |
| JP | 2011-240873 A | 12/2011 |
| JP | 2012-214091 A | 11/2012 |

OTHER PUBLICATIONS

International Search Report (PCT/ISA/210) mailed on Mar. 25, 2014, by the Japanese Patent Office as the International Searching Authority for International Application No. PCT/JP2014/052291.

*Primary Examiner* — Bradley King
*Assistant Examiner* — James Hsiao
(74) *Attorney, Agent, or Firm* — Buchanan Ingersoll & Rooney PC

(57) ABSTRACT

The braking device for a vehicle includes a judging portion which judges whether the input piston and the output piston
(Continued)

are in contact with or separated from each other and a control portion which outputs the control signal to the pilot pressure generating device so that the hydraulic pressure detected by the hydraulic pressure detecting device becomes a target value corresponding to a vehicle state, when judged that the input piston is not in contact with the output piston and outputs another control signal to the pilot pressure generating device, by which the pilot pressure becomes higher than the pilot pressure generated under a same vehicle state to a vehicle state in a case that the control signal is outputted when the judging portion judges that the input piston is not in contact with the output piston, when judged that the input piston is in contact with the output piston.

6 Claims, 8 Drawing Sheets

(51) Int. Cl.
*B60T 13/66* (2006.01)
*B60T 8/40* (2006.01)
*B60T 7/04* (2006.01)
*B60T 13/68* (2006.01)

(52) U.S. Cl.
CPC .......... *B60T 13/146* (2013.01); *B60T 13/148* (2013.01); *B60T 13/686* (2013.01)

(56) References Cited

U.S. PATENT DOCUMENTS

| | | | |
|---|---|---|---|
| 5,544,724 A * | 8/1996 | Kurasako | B60T 11/28 188/72.2 |
| 2008/0229741 A1 | 9/2008 | Isono et al. | |
| 2010/0326073 A1 | 12/2010 | Isono et al. | |
| 2011/0285199 A1 | 11/2011 | Ishida | |
| 2013/0255249 A1 * | 10/2013 | Maruyama | F15B 15/02 60/562 |
| 2013/0318963 A1 * | 12/2013 | Masuda | B60T 13/147 60/591 |
| 2014/0327296 A1 | 11/2014 | Ishida | |

\* cited by examiner

CYLINDER OPENING SIDE ←——————→ CYLINDER BOTTOM SURFACE SIDE

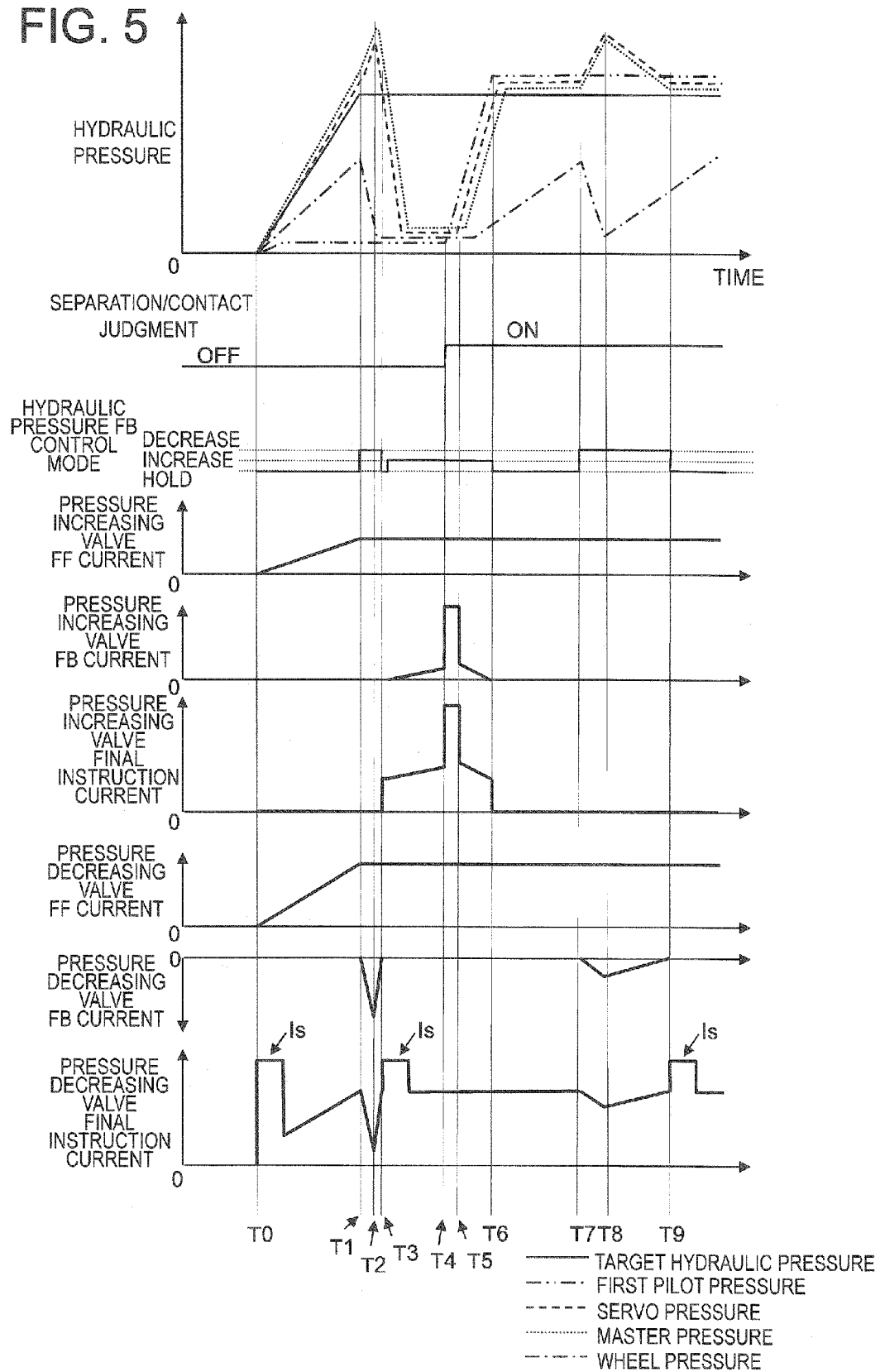

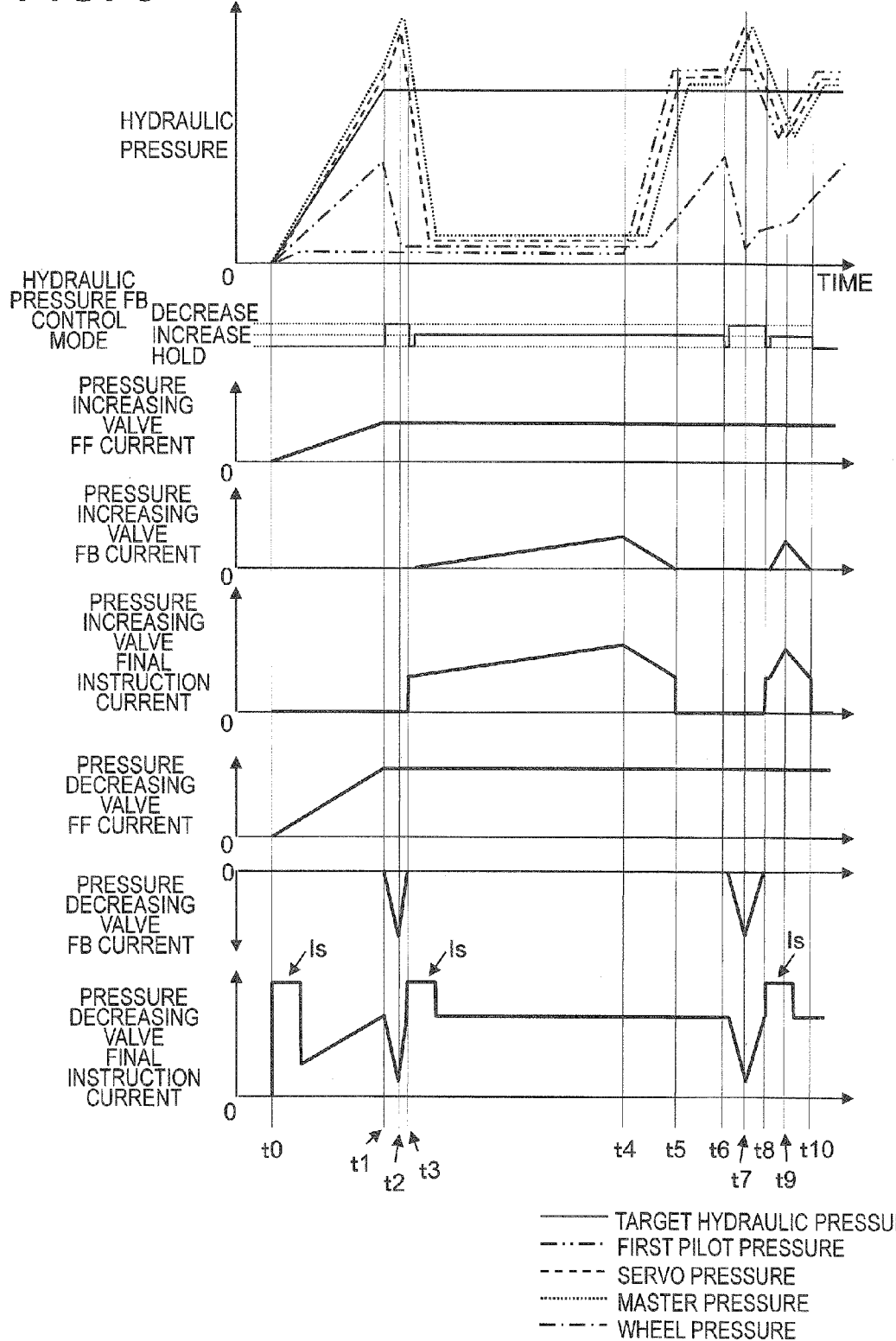

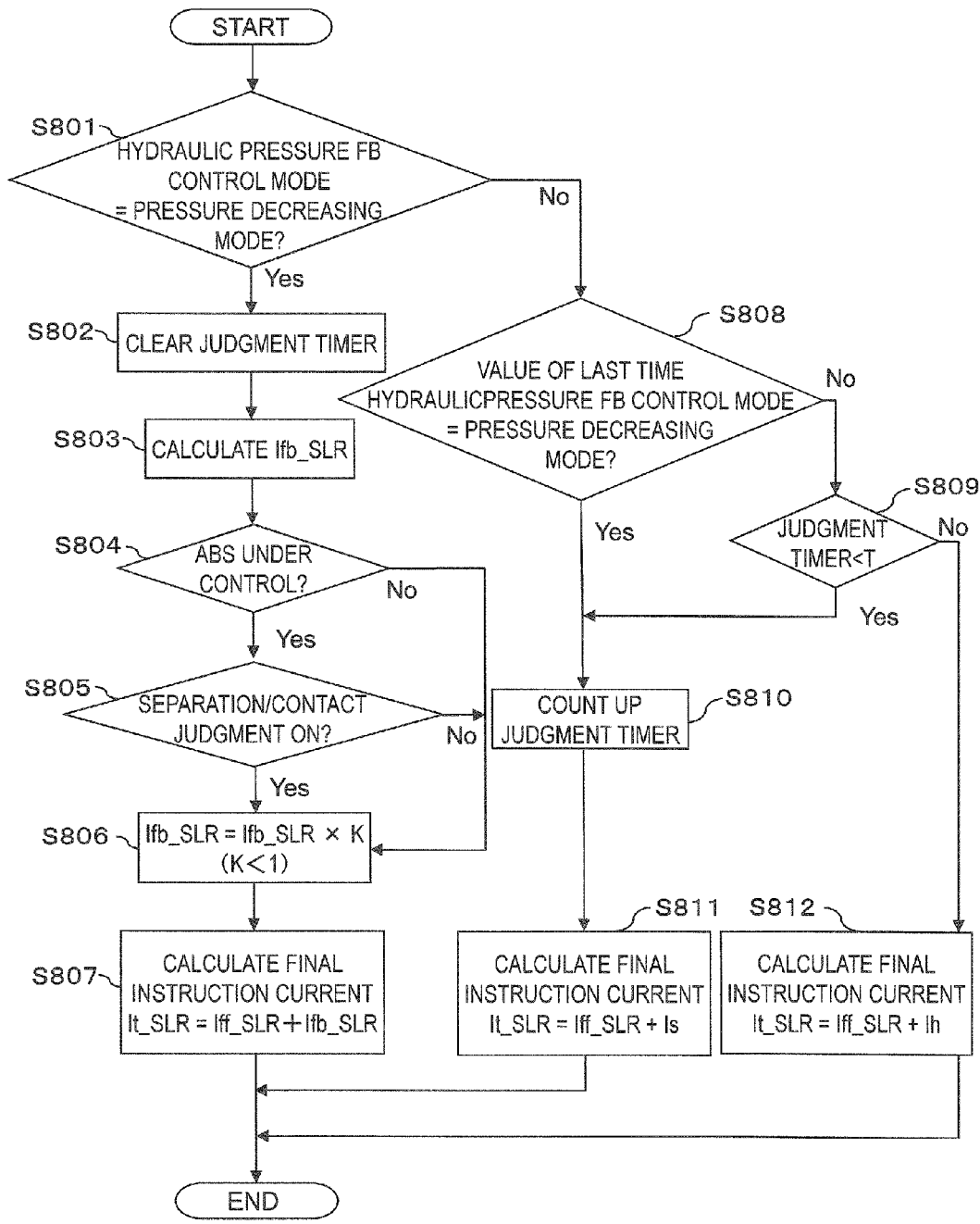

BRAKING DEVICE FOR VEHICLE

TECHNICAL FIELD

This invention relates to a braking device for vehicle used for a vehicle.

BACKGROUND ART

A braking device for a vehicle is equipped with a master cylinder, an output piston which varies the volume of a master chamber by being driven by a force corresponding to a hydraulic pressure in a servo chamber, an input piston defining a first hydraulic pressure chamber to be filled with a brake fluid with the output piston and operable in association with an operation of a brake operating member, a mechanical servo pressure generating device which outputs a hydraulic pressure corresponding to a higher hydraulic pressure between the hydraulic pressure inputted to a first pilot chamber and a hydraulic pressure inputted to a second pilot chamber, a pilot pressure generating device which generates a hydraulic pressure corresponding to an inputted control signal in the first pilot chamber and a passage connecting the master chamber and the second pilot chamber. This type of the braking device for a vehicle is, for example, described in a patent publication JP2011-240873 A.

CITATION LIST

Patent Literature

Patent Literature 1: JP2011-240873 A

SUMMARY OF INVENTION

Technical Problem(s)

According to the above described braking device for a vehicle, the input piston may be brought into contact with (abutting) the output piston when an emergency brake operation is performed, i.e., a sudden operation to the brake operating member is applied in an advancement direction to advance the input piston.

There is a room for improvements in responsiveness of servo pressure control under such state.

Accordingly, this invention was made in consideration with the above-mentioned situation and the objective of the invention is to provide a braking device for a vehicle which can exhibit a high responsiveness of servo pressure control under the input piston and the output piston being in contact with each other.

Solution to Problem(s)

The braking device for a vehicle according to a first aspect of the invention includes a master cylinder, an output piston slidably provided in the master cylinder and varying the volume of a master chamber by being driven by a force corresponding to a hydraulic pressure in a servo chamber which is defined by the master cylinder, an input piston slidably provided in the master cylinder at a rearward of the output piston and defining a first hydraulic pressure chamber to be filled with a brake fluid, with the output piston, the input piston being operable in association with an operation of a brake operating member, an inter-chamber passage which connects a second hydraulic pressure chamber, a volume of which is decreased as the output piston moves forward, and the first hydraulic pressure chamber, a mechanical servo pressure generating device which outputs a hydraulic pressure at an output port, corresponding to a hydraulic pressure which is a higher hydraulic pressure between the hydraulic pressure inputted to a first pilot chamber and a hydraulic pressure inputted to a second pilot chamber, a first route which connects the servo chamber and the output port, a hydraulic pressure detecting device which detects a hydraulic pressure in the first route, a pilot pressure generating device which generates a pilot pressure corresponding to a control signal inputted thereto in the first pilot chamber, and a second route which connects the master chamber and the second pilot chamber. The braking device for the vehicle further includes a judging portion which judges whether the input piston and the output piston are in contact with or separated from each other and a control portion which outputs the control signal to the pilot pressure generating device so that the hydraulic pressure detected by the hydraulic pressure detecting device becomes a target value corresponding to a vehicle state when the judging portion judges that the input piston is not in contact with the output piston. The control portion outputs another control signal to the pilot pressure generating device at a time when the judging portion judges that the input piston is in contact with the output piston. The pilot pressure generated by the pilot pressure generating device according to the another control signal is higher than the pilot pressure generated by the pilot pressure generating device according to the firstly mentioned control signal when the judging portion judges that the input piston is not in contact with the output piston under the same vehicle state as that at the time when the judging portion judges that the input piston is in contact with the output piston.

The braking device for a vehicle according to a second aspect of the invention is characterized in that in the feature of the first aspect, an actuator is provided for introducing a brake fluid into the master chamber, wherein the control portion outputs the another control signal at a time when the judging portion judges that the input piston is in contact with the output piston and the brake fluid is introduced into the master cylinder, the pilot pressure generated by the pilot pressure generating device according to the another control signal being higher than the pilot pressure generated by the pilot pressure generating device according to the firstly mentioned control signal when the judging portion judges that the input piston is not in contact with the output piston under the same vehicle state as that at the time when the judging portion judges that the input piston is in contact with the output piston and the brake fluid is introduced into the master cylinder.

The braking device for a vehicle according to a third aspect of the invention is characterized in that in the feature of the above first aspect or the second aspect of the invention, an actuator is provided for discharging a brake fluid from the master chamber, the control portion outputs the second control signal at a time when the judging portion judges that the input piston is in contact with the output piston and the brake fluid is discharged from the master cylinder, the pilot pressure generated by the pilot pressure generating device according to the another control signal being higher than the pilot pressure generated by the pilot pressure generating device according to the firstly mentioned control signal when the judging portion judges that the input piston is not in contact with the output piston under the same vehicle state as that at the time when the judging portion judges that the input piston is in contact with the output piston and the brake fluid is discharged from the master cylinder.

The braking device for a vehicle according to a fourth aspect of the invention is characterized in that in the feature of any of the first aspect through the third aspect, the control portion calculates and outputs a corrected control signal at a time when the judging portion judges that the input piston is in contact with the output piston, the corrected control signal being calculated by correcting the first control signal outputted when the judging portion judges that the input piston is not in contact with the output piston in such a manner that the pilot pressure generated by the pilot pressure generating device according to the corrected control signal is higher than the pilot pressure generated by the pilot pressure generating device according to the first control signal when the judging portion judges that the input piston is not in contact with the output piston under the same vehicle state as that at the time when the judging portion judges that the input piston is in contact with the output piston, and a correcting amount of the first control signal is varied in response to a braking state of the vehicle.

The braking device for a vehicle according to a fifth aspect of the invention is characterized in that in the feature of the fourth aspect, a hydraulic pressure control device is provided between the master chamber and each of a plurality of wheel cylinders for controlling a hydraulic pressure of each of the wheel cylinders by introducing the brake fluid at a wheel cylinder side into the master chamber, wherein the control portion changes the correcting amount based on a number of wheel cylinders which are the subject of control of the hydraulic pressure control device among the plurality of wheel cylinders as the braking state of the vehicle.

The braking device for a vehicle according to a sixth aspect of the invention is characterized in that in the feature of the fourth aspect or the fifth aspect, a hydraulic pressure control device is provided between the master chamber and each of a plurality of wheel cylinders for controlling a hydraulic pressure of each of the wheel cylinders by discharging the brake fluid from the master chamber to a wheel cylinder side, wherein the control portion changes the correcting amount based on a number of wheel cylinders which are the subject of control of the hydraulic pressure control device among the plurality of wheel cylinders as the braking state of the vehicle.

When the input piston is in contact with the output piston (hereinafter referred to as at the "contact state"), the output piston is driven by the sum of a force corresponding to the servo pressure and an operating force on a brake operating member and accordingly, the hydraulic pressure in the master chamber (hereinafter referred to as the "master pressure") becomes high compared to the master pressure when the input piston is not in contact with the output piston (hereinafter referred to as at the "non-contact state"). Further, in such case, the hydraulic pressure in the second pilot chamber (master pressure) becomes higher than the hydraulic pressure in the first pilot chamber (pilot pressure) and accordingly, the servo pressure becomes a hydraulic pressure corresponding to the master pressure.

Therefore, when the pilot pressure generating device is controlled by a control signal at contact state, which makes the servo pressure to be a target value based on the hydraulic pressure detected by the detecting device which detects the servo pressure, the control signal becomes a control signal corresponding to a pilot pressure lower than the pilot pressure at the non-contact state under the same vehicle state at the contact state. Accordingly, at the contact state, the timing of transition (hereinafter referred to as "transition timing") from the state that the servo pressure becomes the hydraulic pressure corresponding to the hydraulic pressure in the second pilot chamber (master pressure) to the state that the servo pressure becomes the hydraulic pressure corresponding to the hydraulic pressure in the first pilot chamber (pilot pressure) is delayed and the hydraulic pressure at this transition timing delay period becomes low. Thus, the responsiveness of the servo pressure control becomes worse than the responsiveness at the non-contact state.

According to the braking device for a vehicle according to the first aspect of the invention, the pilot pressure at the contact state is kept to a high pressure level. Therefore, the responsiveness of the servo pressure control can be improved by making the transition timing earlier and accordingly, by the increase of the servo pressure at the transition timing.

According to the braking device for a vehicle of the second aspect of the invention, the master pressure increases when the brake fluid is introduced into the master chamber by the actuation of the actuator. Then the output piston retreats by being driven by a force corresponding to the master pressure to thereby increase the servo pressure.

Assuming that the pilot pressure generating device is controlled by the control signal similarly both at the contact state and at the non-contact state, when the servo pressure is increased as explained above and the increased servo pressure exceeds the target value, the control signal changes to lower the pilot pressure.

According to the second aspect of the invention, when the brake fluid is introduced into the master chamber at the contact state, the pilot pressure generating device is controlled according to the second control signal which makes the pilot pressure higher than the pilot pressure generated according to the first control signal outputted at the non-contact state under the same vehicle state as that at the contact state.

Thus, by keeping the pilot pressure to a high hydraulic pressure level when a probability of dropping of the pilot pressure is high, the responsiveness of the servo pressure control can be effectively improved.

According to the braking device for a vehicle of the third aspect of the invention, when the brake fluid in the master chamber is discharged therefrom, the master pressure (hydraulic pressure in the second pilot chamber) becomes low and accordingly, the servo pressure drops.

It is noted here that assuming that the pilot pressure generating device is controlled by the control signal similarly both at the contact state and at the non-contact state, when the servo pressure drops to a value less than the target value, the control signal changes to increase the pilot pressure.

According to the third aspect of the invention, when the brake fluid is discharged from the master chamber at the contact state the pilot pressure generating device is controlled according to the second control signal which makes the pilot pressure higher than the pilot pressure generated according to the first control signal outputted at the non-contact state under the same vehicle state as that at the contact state.

As explained, when the master pressure (hydraulic pressure in the second pilot chamber) drops and at the same time the pilot pressure (hydraulic pressure in the first pilot chamber) increases, i.e., when a probability of the state transition from the state that the servo pressure is the hydraulic pressure corresponding to the master pressure to the state that servo pressure is the hydraulic pressure corresponding to the pilot pressure is high, the pilot pressure is kept to a high level hydraulic pressure to effectively improve the responsiveness of the servo pressure control.

It is noted here that considering the structure of deriving a corrected control signal at the contact state by correcting the control signal outputted at non-contact state in such a manner that the pilot pressure generated according to the another control signal is higher than the pilot pressure generated according to the control signal at the non-contact state under the same vehicle state as that at the contact state, the correcting amount necessary for securing the responsiveness of the servo pressure control while changing from the contact state to the non-contact state varies depending on the braking state of the vehicle.

Accordingly, according to the braking device for a vehicle of the fourth aspect of the invention, the correcting amount is varied in response to the braking state of the vehicle. By this structure, the pilot pressure at the contact state can be surely kept to be a high level hydraulic pressure.

Further, a hydraulic pressure control device is provided between the master chamber and each of a plurality of wheel cylinders for controlling a hydraulic pressure of each of the wheel cylinders by introducing the brake fluid at a wheel cylinder side into the master chamber. The number of the wheel cylinders which are the subject of control of the hydraulic pressure control device is the braking state of the vehicle.

Still further, a hydraulic pressure control device is provided between the master chamber and each of a plurality of wheel cylinders for controlling a hydraulic pressure of each of the wheel cylinders by discharging the brake fluid in the master chamber to a wheel cylinder side. The number of the wheel cylinders which are the subject of control of the hydraulic pressure control device is the braking state of the vehicle.

BRIEF EXPLANATION OF ATTACHED DRAWINGS

FIG. 5 is a time chart showing a control signal of the braking device for a vehicle according to the embodiment;

FIG. 6 is a time chart showing a control signal of a conventional braking device for a vehicle;

FIG. 8 is a time chart showing a control of the pressure decreasing valve of the braking device for the vehicle according to the embodiment.

EMBODIMENTS FOR IMPLEMENTING INVENTION

Figure 1:
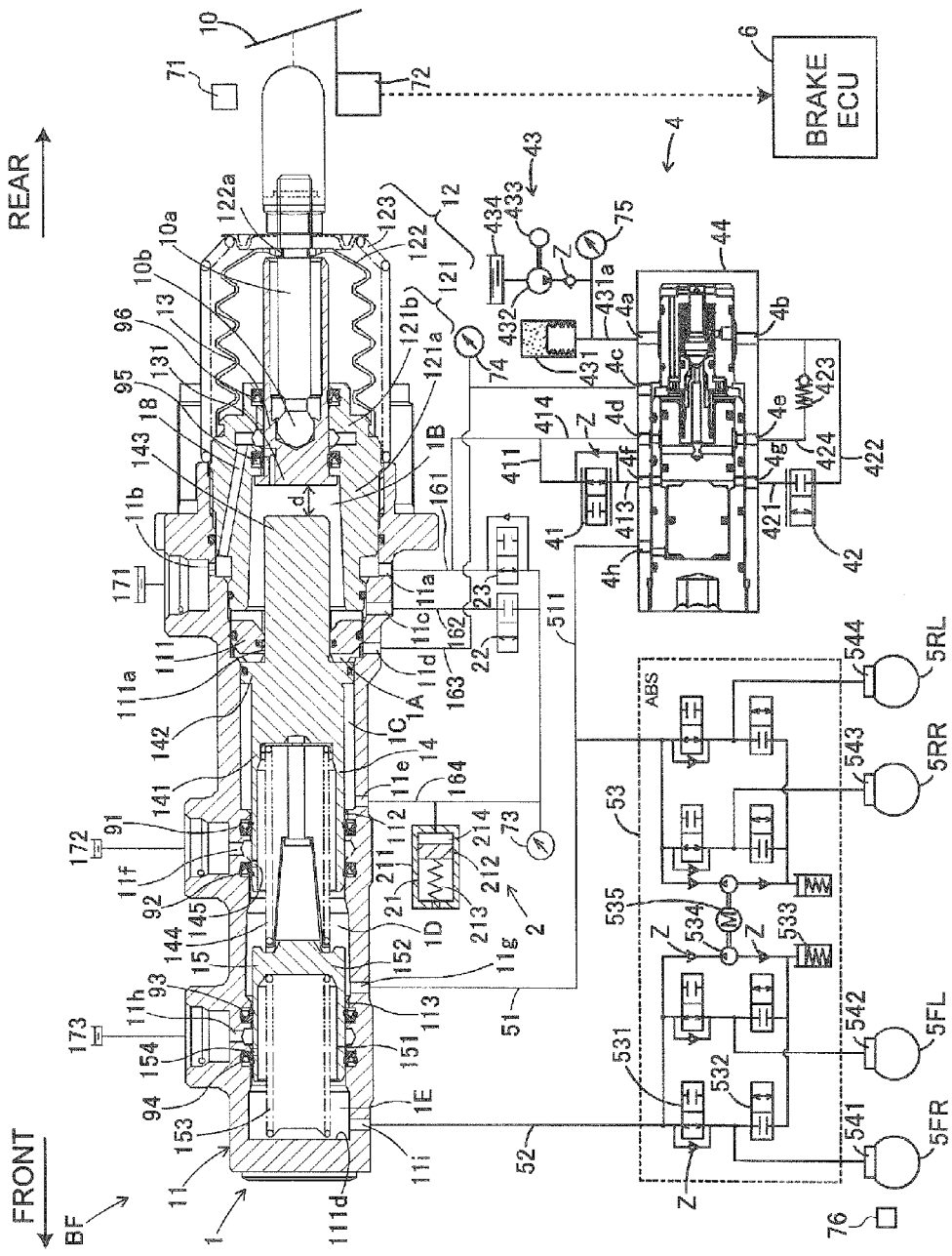
FIG. 1 is a structural view of the braking device for a vehicle according to an embodiment of the invention.

The brake control device and the braking device for a vehicle which is controllable by the brake control device according to the embodiment of the invention will be explained hereinafter with reference to the attached drawings. It is noted that the same or equivalent components or parts are referenced with the same symbols or the numerals and the shape and the size of each component in the drawings, by which the structural explanation thereof will be made, are not necessarily accurate to the actual product.

First Embodiment

As shown in FIG. 1, the braking device for the vehicle is formed by a hydraulic pressure braking force generating device BF which generates the hydraulic pressure braking force and applies the hydraulic pressure braking force to the vehicle wheels 5FR, 5FL, 5RR and 5RL and a brake ECU 6 which controls the hydraulic pressure braking force generating device BF.

Hydraulic Pressure Braking Force Generating Device BF

The hydraulic pressure braking force generating device BF is formed by a master cylinder 1, a reaction force generating device 2, a first electromagnetic valve 22, a second electromagnetic valve 23, and a servo pressure generating device 4, an Anti-lock Brake System (ABS) (corresponding to a "hydraulic pressure control device" and an "actuator") 53 and various sensors 71 through 76 and so on.

Master Cylinder 1

The master cylinder 1 is a portion which supplies the hydraulic pressure control device (ABS) 53 with the operating fluid in response to the operating amount of a brake pedal 10 (corresponding to "brake operating member") and is formed mainly by a main cylinder 11, a cover cylinder 12, an input piston 13, a first master piston (corresponding to "output piston") 14 and a second master piston 15 and so on.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof. The main cylinder 11 is provided therein at portions closer to the front end than the inner wall portion 111 with small diameter portions 112 (rear) and 113 (front), each of which inner diameter is set to be somewhat smaller than the inner diameter of the inner wall portion 111. In other words, the small diameter portions 112, and 113 project from the inner circumferential surface of the main cylinder 11 having an inwardly annularly shaped profile. The first master piston 14 is provided inside the main cylinder 11 and is slidably movable along the small diameter portion 112 in the axial direction. Similarly, the second master piston 15 is provided inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than an inner diameter of the front portion 121a.

The boots 122 is of tubular bellow shaped and is used for dust prevention purpose and is extendible or compressible in front and rearward directions. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical potion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the inner wall portion 111 and the outer peripheral surface of the first master piston 14. A front portion and a rear portion of the flange portion 142 of the first master piston 14 separates the rear chamber into front and rear sides and the front side is defined to be a "second hydraulic pressure chamber 1C" and the rear side thereof is defined to be a "servo chamber 1A". A "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 12. The first hydraulic pressure chamber 1B is filled with a brake fluid.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. "A second master chamber 1E" is defined by the inner peripheral surface and the inner bottom surface 111d of the main cylinder 11 and the pressurizing cylindrical portion 151 of the second master piston 15.

Ports 11a to 11i, which connect the inside and the outside of the master cylinder 1, are formed at the master cylinder 1. The port 11a is formed at a location rearward of the inner wall portion 111 at the main cylinder 11. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the inner wall portion 111 and at the same time forward of the port 11c and the port 11d connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward.

The port 11g is formed at a location forward of the port 11f and connects the first master chamber 1D with a conduit 51. The port 11h is formed between the sealing members 93 and 94 provided at the small diameter portion 113 and connects a reservoir 173 with the inside of the main cylinder 11. The port 11h is in communication with the second master chamber 1E via a passage 154 formed at the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

A sealing member, such as an O-ring and the like (see black dot in the drawings) is appropriately provided within the master cylinder 1. The sealing members 91 and 92 are provided at the small diameter portion 112 and are in liquid-tightly contact with the outer circumferential surface of the first master piston 14. Similarly, the sealing members 93 and 94 are provided at the small diameter portion 113 and are in liquid-tightly contact with the outer circumferential surface of the second master piston 15. Additionally, sealing members 95 and 96 are provided between the input piston 13 and the cylindrical portion 121.

The stroke sensor 71 is a sensor which detects the operating amount (stroke amount) of the operation of the brake pedal 10 by a driver of the vehicle and transmits the detected result to the brake ECU 6. A brake stop switch 72 is a switch which detects whether the brake pedal 10 is depressed or not, using a binary signal and a detected signal is sent to the brake ECU 6.

Reaction Force Generating Device 2

The reaction force generating device 2 is a device which generates a reaction force against the operation force when the brake pedal 10 is depressed and is formed by mainly a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein. The piston 212 is biased in the frontward direction by a compression spring 213 and a reaction force hydraulic pressure chamber 214 is formed at a location frontward of the piston 212. The reaction force hydraulic pressure chamber 214 is connected to the second hydraulic pressure chamber 1C via a conduit 164 and the port 11e, and is connected further to the first electromagnetic valve 22 and the second electromagnetic valve 23 via the conduit 164.

First Electromagnetic Valve 22

The first electromagnetic valve 22 is an electromagnetic valve which is structured to close under non-energized state and opening and closing thereof are controlled by the brake ECU 6. The first electromagnetic valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first electromagnetic valve 22 opens and becomes in closed state when the first electromagnetic valve 22 closes. Accordingly, the conduits 164 and 162 are formed for establishing fluid communication between the first hydraulic pressure chamber 1B and the second hydraulic pressure chamber 1C (corresponding to the "inter-chamber passage").

The first electromagnetic valve 22 is closed under non-energized state and under this state communication between the first hydraulic pressure chamber 1B and the second hydraulic pressure chamber 1C is interrupted. Due to the closure of the first hydraulic pressure chamber 1B, the operating fluid is nowhere to flow and the input piston 13 and the first master piston 14 are moved integrally keeping the separation distance "d" therebetween to be constant. The first electromagnetic valve 22 is open under the energized state and under such state, the communication between the first hydraulic pressure chamber 1B and the second hydraulic pressure chamber 1C is established. Thus, the volume change in the first hydraulic pressure chamber 1B and the second hydraulic pressure chamber 1C due to the advancement and retreatment of the first master piston 14 can be absorbed by the transferring of the operating fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first electromagnetic valve 22 is in a closed state. On the other hand, while the first electromagnetic valve 22 is in an open state, the pressure sensor 73 also detects the pressure (or the reaction force hydraulic pressure) in the hydraulically connected first hydraulic pressure chamber 1B. The pressure sensor 73 sends the detected signal to the brake ECU 6.

Second Electromagnetic Valve 23

The second electromagnetic valve 23 is an electromagnetic valve which is structured to open under a non-energized state and the opening and closing thereof is controlled by the brake ECU 6. The second electromagnetic valve 23 is disposed between the conduit 164 and the conduit 161 for establishing communication therebetween. The conduit 164 is in communication with the second hydraulic pressure chamber 1C via the port 11e and the conduit 161 is in communication with the reservoir 171 via the port 11a. Accordingly, the second electromagnetic valve 23 establishes communication between the second hydraulic pressure chamber 1C and the reservoir 171 under the non-energized state not to generate any reaction force hydraulic pressure but interrupts the communication therebetween to generate the reaction force hydraulic pressure under the energized state.

Servo Pressure Generating Device 4

The servo pressure generating device 4 is formed by a pressure decreasing valve 41, a pressure increasing valve 42, a high pressure supplying portion 43 and a regulator 44 and so on. The pressure decreasing valve 41 is a valve structured to open under a non-energized state and the flow-rate thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 via the conduits 411, 161 and ports 11a and 11b. The pressure increasing valve 42 is a valve structured to close under a non-energized state and the flow-rate thereof is controlled by the brake ECU 6. One end of the pressure increasing valve 42 is connected to the conduit 421 and the other end thereof is connected to the conduit 422. Both pressure decreasing and increasing valves 41 and 42 correspond to a pilot hydraulic pressure generating device.

The high pressure supplying portion 43 is a portion for supplying the regulator 44 with a highly pressurized operating fluid. The high pressure supplying portion 43 includes an accumulator (high pressure source) 431, a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431a. The hydraulic pressure pump 432 is driven by the motor 433 and supplies the pressurized operating fluid to the accumulator 431, the operating fluid being accumulated in the reservoir 434. The pressure sensor 75 provided in the conduit 431a detects the accumulator hydraulic pressure in the accumulator 431 and the detected signal is sent to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the pressurized operating fluid with the accumulator 431 in order to recover a pressure up to the value equal to or more than the predetermined value.

Figure 2:
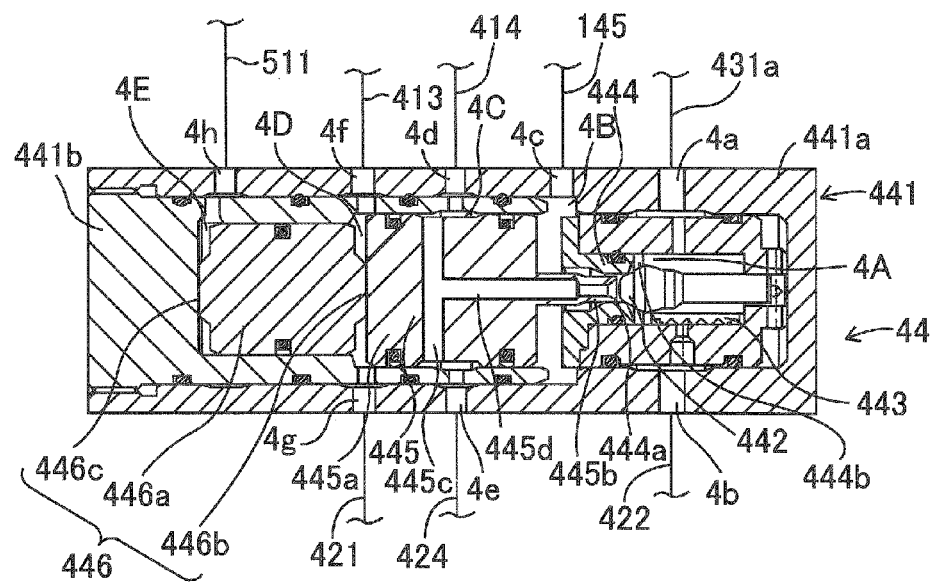
FIG. 2 is a cross sectional view of a regulator showing a detail structure thereof according to the embodiment.

FIG. 2 is a partial cross sectional view illustrating a configuration of the inside of the mechanical regulator 44 which forms the servo pressure generating device 4. As shown in the drawing, the regulator 44 (corresponding to "servo pressure generating device") includes a cylinder 441, a ball valve 442, a biasing portion 443, a valve seat portion 444, a control piston 445 and a sub-piston 446 and so forth.

The cylinder 441 includes a cylinder case 441a formed in a substantially bottomed cylinder-shape having a bottom surface at one end thereof (at the right side in FIG. 2) and a cover member 441b closing an opening of the cylinder case 441a (at the left side thereof in FIG. 2). It is noted here that the cover member 441b is formed to be a C-shape in cross section in the drawing, but in this embodiment, the shape of the cover member 441b is of columnar shape and a portion which closes the opening of the cylinder case 441a is explained as the cover member 441b. The cylinder case 441a is provided with a plurality of ports 4a through 4h, through which the inside and the outside of the cylinder case 441a are in communication.

The port 4a is connected to the conduit 431a. The port 4b is connected to the conduit 422. The port (corresponding to "output port") 4c is hydraulically connected to a conduit 163 (corresponding to the "first route"). The conduit 163 connects the servo chamber 1A and the output port 4c. The port 4d is connected to the conduit 161 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441a inside of the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder into the cylinder opening side and the cylinder bottom surface side. A through passage 444a through which the divided cylinder opening side and the cylinder bottom surface side are in communication is formed at a center of the valve seat portion 444. The valve seat portion 444 supports the ball valve 442 from the cylinder opening side in a manner that the biased ball valve 442 closes the through passage 444a.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the operating fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is arranged in the cylinder 441 in a coaxial and liquid-tight manner on the cylinder opening side of the valve seat portion 444, the main body portion 445a being slidably movable in the axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in FIG. 2) and both end portions thereof open at a circumferential surface of the main body portion 445a. A portion of an inner circumferential surface of the cylinder 441 corresponding to an opening position of the passage 445*c* is provided with the port 4*d* and is formed to be recessed, which recessed space portion forms a "third chamber 4C".

The projection portion 445*b* projects towards the cylinder bottom surface side from a center portion of an end surface of the cylinder bottom surface side of the main body portion 445*a*. The projection portion 445*b* is formed so that the diameter thereof is smaller than the diameter of the through passage 444*a* of the valve seat portion 444. The projection portion 445*b* is coaxially provided relative to the through passage 444*a*. A tip end of the projection portion 445*b* is spaced apart from the ball valve 442 towards the cylinder opening side by a predetermined distance under the state shown in FIG. 2. A passage 445*d* is formed at the projection portion 445*b* so that the passage 445*d* extends in the cylinder axis direction and opens at a center portion of an end surface of the projection portion 445*b*. The passage 445*d* extends up to the inside of the main body portion 445*a* and is connected to the passage 445*c*.

A space defined by the end surface of the cylinder bottom surface side of the main body portion 445*a*, an outer surface of the projection portion 445*b*, the inner circumferential surface of the cylinder 441, the valve seat portion 444 and the ball valve 442 is referred to as a "second chamber 4B". The second chamber 4B is in communication with the ports 4*d* and 4*e* via the passages 445*d* and 445*c* and the third chamber 4C.

The sub-piston 446 includes a sub main body portion 446*a*, a first projection portion 446*b* and a second projection portion 446*c*. The sub main body portion 446*a* is formed in a substantially columnar shape. The sub main body portion 446*a* is arranged within the cylinder 441 in a coaxial and liquid-tight manner on the cylinder opening side of the main body portion 445*a* the sub main body portion 446*a* being slidably movable in the axial direction.

The first projection portion 446*b* is formed in a substantially columnar shape having a smaller diameter than the sub main body portion 446*a* and projects from a center portion of an end surface of the cylinder bottom surface side of the sub main body portion 446*a*. The first projection portion 446*b* is in contact with the end surface of the cylinder bottom surface side of the sub main body portion 446*a*. The second projection portion 446*c* is formed in the same shape as the first projection portion 446*b*. The second projection portion 446*c* projects from a center portion of an end surface of the cylinder opening side of the sub main body portion 446*a*. The second projection portion 446*c* is in contact with the cover member 441*b*.

A space defined by the end surface of the cylinder bottom surface side of the sub main body portion 446*a*, an outer peripheral surface of the first projection portion 446*b*, an end surface of the cylinder opening side of the control piston 445 and the inner circumferential surface of the cylinder 441 is referred to as a "first pilot hydraulic pressure chamber 4D". The first pilot hydraulic pressure chamber 4D is in communication with the pressure decreasing valve 41 via the port 4*f* and the conduit 413 and is in communication with the pressure increasing valve 42 via the port 4*g* and the conduit 421.

A space defined by the end surface of cylinder opening side of the sub main body portion 446*a*, an outer peripheral surface of the second projection portion 446*c*, the cover member 441*b* and the inner circumferential surface of the cylinder 441 is referred to as a "second pilot chamber 4E". The second pilot chamber 4E is in communication with the port 11*g* via the port 4*h* and the conduits 511 and 51. Each of the chambers 4A through 4E is filled with the operating fluid. The pressure sensor (corresponding to "hydraulic pressure detecting device") 74 is a sensor that detects the servo pressure (driving hydraulic pressure) to be supplied to the servo chamber 1A and is connected to the conduit 163. The pressure sensor 74 sends the detected signal to the brake ECU 6.

ABS 53

The first and the second master chambers 1D and 1E which generate the master cylinder hydraulic pressure are connected to the wheel cylinders 541 through 544 via the conduits 51 and 52 and the ABS (Anti Lock Brake System) 53. In more specifically, the port 11*g* of the first master chamber 1D and the port 11*i* of the second master chamber 1E are connected to the well-known ABS 53 via the conduits 51 and 52, respectively. The ABS 53 is connected to the wheel cylinders 541 through 544 which operate to perform friction braking operation at the wheels 5FR through 5RL.

The structure of the ABS 53 will be explained with regards to one (5FR) of the four wheels and the other structures are the same and are omitted from explanation thereof. The ABS 53 includes a holding valve 531, a pressure decreasing valve 532, a reservoir 533, a pump 534 and a motor 535. The holding valve 531 is a normally open type electromagnetic valve whose opening and closing are controlled by the brake ECU 6. One end of the holding valve 531 is connected to the conduit 52 and the other end thereof is connected to the wheel cylinder 541 and the pressure decreasing valve 532. In other words, the holding valve 531 serves as an input valve for the ABS 53.

The pressure decreasing valve 532 is a normally closed type electromagnetic valve whose opening and closing are controlled by the brake ECU 6. One end of the pressure decreasing valve 532 is connected to the wheel cylinder 541 and the holding valve 531 and the other end thereof is connected to the reservoir 533. When the pressure decreasing valve 532 becomes in open state, the fluid communication between the wheel cylinder 541 and the reservoir 33 is established.

The reservoir 533 serves as a reservoir for reserving the brake fluid and is connected to the conduit 52 via the pressure decreasing valve 532 and the pump 534. The suction port of the pump 534 is connected to the reservoir 533 and ejection port is connected to the conduit 52 via a check valve "z". The check valve "z" allows the flow of fluid from the pump 534 to the conduit 52 (second master chamber 1E) but restricts the flow in a reverse direction. The pump 534 is driven by the operation of the motor 535 responding to the instructions from the brake ECU 6. The pump 534 suctions the brake fluid in the wheel cylinder 541 or the brake fluid reserved in the reservoir 533 and returns the suctioned brake fluid to the second master chamber 1E when the ABS 53 is under a pressure decreasing control mode. It is noted that a damper (not shown) is provided in the upstream side of the pump 534 in order to dampen the pulsation of the brake fluid discharged from the pump 534.

The ABS 53 is equipped with a vehicle wheel sped sensor 76 which detects the wheel speed of the vehicle. The detected signal indicating the wheel speed detected by the vehicle wheel speed sensor 76 is outputted to the brake ECU 6, Under thus structured ABS 53, the brake ECU 6 controls opening and closing of each of the electromagnetic valves 531 and 532 based on the master pressure, state of vehicle wheel speed and front/rearward acceleration and executes the ABS control (Anti-lock brake control) which regulates the brake hydraulic pressure to be applied to the wheel cylinder 541, i.e., the braking force to be applied to the vehicle wheel 5FR by operating the motor 535 as may be necessary. The ABS 53 is a device which supplies the wheel cylinders 541 through 544 with the brake fluid by adjusting the amount and the timing thereof supplied from the master cylinder 1.

According to the "linear mode" which will be explained later, the hydraulic pressure sent out from the accumulator 431 of the servo pressure generating device 4 is controlled by the pressure increasing valve 42 and the pressure decreasing valve 41 to generate the servo pressure in the servo chamber 1A. Then the first master piston 14 and the second master piston 15 advance to pressurize the brake fluid in the first master chamber 1D and the second master chamber 1E. The hydraulic pressures in the first master chamber 1D and the second master chamber 1E are supplied via the ports 11g and 11i and conduits 51 and 52 and the ABS 53 to the wheel cylinders 541 through 544 as the master pressure. Thus the hydraulic pressure braking force is applied to the vehicle wheels 5FR through 5RL.

Accordingly, the vehicle braking device according to the embodiment is provided with the hydraulic pressure control device (ABS) 53 between the master cylinder 1 and each of the wheel cylinders 541 through 544. The hydraulic pressure control device 53 adjusts the hydraulic pressure supplied from the master chamber 1D and supplies the wheel cylinders 541 through 544 with the adjusted hydraulic pressure. The hydraulic pressure control device 53 is provided with the holding valve 531 one side of which is connected to the master chamber 1D and the other side of which is connected to each of the wheel cylinders 541 through 544, the pressure decreasing valve 532 one side of which is connected to the other side of the holding valve 531 and the each of the wheel cylinders 541 through 544 and the other side of which is connected to the reservoir 533 and the pump 534 one side of which is connected to the one side of the holding valve 531 and the master chamber 1D and the other side of which is connected to the other side of the pressure decreasing valve 532 and the reservoir 533.

Brake ECU 6

The brake ECU 6 is an electronic control unit and includes a microprocessor. The microprocessor includes an input/output interface, CPU, RAM, ROM and a memory portion such as non-volatile memory and so on, connected with one another through bus communication.

The brake ECU 6 is connected to the various sensors 71 through 76 for controlling the electromagnetic valves 22, 23, 41 and 42 and the motor 433. The operating amount (stroke amount) of brake pedal 10 operated by the operator of the vehicle is inputted to the brake ECU 6 from the stroke sensor 71, whether or not the operation of the brake pedal 10 by the operator of the vehicle is performed is inputted to the brake ECU 6 from the brake stop switch 72, the reaction force hydraulic pressure of the second hydraulic pressure chamber 1C or the pressure of the first hydraulic pressure chamber 1B is inputted to the brake ECU 6 from the pressure sensor 73, the servo pressure (driving hydraulic pressure) supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR through 5RL is inputted to the brake ECU 6 from each of the vehicle wheel speed sensors 76. The brake ECU 6 memorizes two control modes, "linear mode" and "REG mode".

Linear Mode

The linear mode of the brake ECU 6 will be explained here. The linear mode is a mode where a normal braking control is performed. In other words, the brake ECU 6 energizes the first electromagnetic valve 22 and opens the first electromagnetic valve 22 and energizes the second electromagnetic valve 23 and closes the second electromagnetic valve 23. By this closing of the second electromagnetic valve 23, the communication between the second hydraulic pressure chamber 1C and the reservoir 171 is interrupted and by the opening of the first electromagnetic valve 22, the communication between the first and the second hydraulic pressure chambers 1B and 1C is established. As explained, the linear mode is a mode for controlling the servo pressure of the servo chamber 1A by controlling the pressure decreasing valve 41 and the pressure increasing valve 42 under the state that the first electromagnetic valve 23 is opened and the second electromagnetic valve 23 is closed. In this linear mode, the brake ECU 6 calculates the "required braking force" required by the driver of the vehicle based on the operating amount of the brake pedal 10 (displacement amount of the input piston 13) detected by stroke sensor 71.

In more detail, under the state that the brake pedal 10 is not depressed, the state becomes the above state, i.e., the state that the ball valve 442 closes the through passage 444a of the valve seat portion 444. In this state, the pressure decreasing valve 41 is in an open state and the pressure increasing valve 42 is in a closed state and accordingly, the first chamber 4A and the second chamber 4B are separated with each other.

The second chamber 4B is in communication with the servo chamber 1A via the conduit 163 to keep the pressures in both chambers 4B and 1A to the same pressure level. The second chamber 4B is in communication with the third chamber 4C via the passages 445c and 445d of the control piston 445 and accordingly, the second chamber 4B and the third chamber 4C are in communication with the reservoir 171 via the conduits 414 and 161. One side of the pilot hydraulic pressure chamber 4D is closed by the pressure increasing valve 42, while the other side thereof is connected to the reservoir 171 through the pressure decreasing valve 41. The pressure level of the first pilot chamber 4D and the second chamber 4B is kept to the same level with each other. The second pilot chamber 4E is in hydraulic communication with the first master chamber 1D via the conduits 511 and 51 to keep the pressure level therebetween is kept to the same level. The conduits 511 and 51 correspond to the "second route".

From this state, when the brake pedal 10 is depressed, the brake ECU 6 controls the pressure decreasing valve 41 and the pressure increasing valve 42 based on the target friction braking force. In other words, the brake ECU 6 controls the pressure decreasing valve 41 towards the valve closing direction and controls the pressure increasing valve 42 towards the valve opening direction.

By the opening of the pressure increasing valve 42, the communication between the accumulator 431 and the first pilot chamber 4D is established. By the closing of the pressure decreasing valve 43, the communication between the first pilot chamber 4D and the reservoir 171 is interrupted. By the high pressure brake fluid supplied from the accumulator 431, the pressure in the first pilot chamber 4D can be increased. By the increase of the pressure in the first pilot chamber 4D, the control piston 445 slidably moves in the cylinder bottom surface side. By this slidable movement of the control piston 445, the tip end of the projecting portion 445*b* of the control piston 445 is brought into contact with the ball valve 442 and the passage 445*d* is closed by the ball valve 442. Then, the communication between the second chamber 4B and the reservoir 171 is interrupted.

By further slidable movement of the control piston 445 towards the cylinder bottom surface side, the ball valve 442 is pushed towards the cylinder bottom surface side by the projection portion 445*b* to thereby separate the ball valve 442 from the valve seat surface 444*b*. This will allow establishment of fluid communication between the first chamber 4A and the second chamber 4B through the through passage 444*a* of the valve seat portion 444. Since the first chamber 4A is supplied with the highly pressurized brake fluid, this establishment of the communication will increase the pressure in the second chamber 4B. It is noted that the greater the separation distance of the ball valve 442 from the valve seat surface 444*b* becomes, the larger the fluid passage for the brake fluid becomes and accordingly, the higher the hydraulic pressure in the downstream of the ball valve 442 is. In other words, the greater the pressure in the first pilot chamber 4D (pilot pressure) becomes, the greater the moving distance of the control piston 445 from the valve seat surface 444*b* of the ball valve 442 becomes, and accordingly, the larger the separation distance of the ball valve 442 from the valve seat surface 444*b* becomes. It is noted here that the brake ECU 6 controls the pressure increasing valve 42 so that the fluid passage at the downstream of the pressure increasing valve 42 becomes large and at the same time controls the pressure decreasing valve 41 so that the fluid passage at the downstream of the pressure decreasing valve 41 becomes small, such that the greater the displacement amount of the input piston 13 (operating amount of the brake pedal 10) detected by the stroke sensor 71 becomes, the higher the pilot pressure in the first pilot chamber 4D becomes. In other words, the larger the displacement amount of the input piston 13 (operating amount of the brake pedal 10) becomes, the higher the pilot pressure becomes and accordingly, the higher the servo pressure becomes.

As the pressure increase of the second chamber 4B, the servo pressure in the servo chamber 1A which is in fluid communication with the second chamber 4B increases. By the pressure increase of the servo pressure, the first master piston 14 advances forward and the pressure in the first master chamber 1D increases. Then the second master piston 15 advances forward and the pressure in the second master chamber 1E increases. By the increase of the pressure in the first master chamber 1D, a high pressure operating fluid is supplied to the ABS 53 which will be explained later and the second pilot chamber 4E. Although the pressure in the second pilot chamber 4E increases, the pressure in the first pilot chamber 4D is also increased, and therefore the sub piston 446 does not move. Thus the brake fluid with high pressure (master pressure) is introduced into the ABS 53 to perform the friction brake operation to control the vehicle. In the "linear mode", the force advancing the first master piston 14 corresponds to the force corresponding to the servo pressure.

When the brake operation is released, the pressure decreasing valve 41 becomes in an open state and the pressure increasing valve 42 becomes in a closed state to establish the fluid communication between the reservoir 171 and the first pilot chamber 4D in an order reverse to the order in the above operation. Then the control piston 445 retreats and the vehicle state returns to the state before the brake pedal 10 is depressed.

REG Mode

"REG mode" is a mode that the pressure decreasing valve 41, the pressure increasing valve 42, the first electromagnetic valve 22 and the second electromagnetic valve 23 become non-energized state or a mode that the valve or the valves become non-energized state due to a failure or the like (state keeping normal state).

When the "REG mode" is executed, the pressure decreasing valve 41, the pressure increasing valve 42, the first electromagnetic valve 22 and the second electromagnetic valve 23 are not energized (not controlled), so that the pressure decreasing valve 41 is kept to be in the open state, the pressure increasing valve 42 is kept to be in the closed state, the first electromagnetic valve 22 is kept to be in the closed state and the second electromagnetic valve 23 is kept to be in the open state. Such non-energized state (non-controlled state) is kept even after the brake pedal 10 is depressed.

In the "REG mode", when the brake pedal 10 is depressed, the input piston 13 advances and the passage 18 is disconnected to interrupt the communication between the first hydraulic pressure chamber 1B and the reservoir 171. Under this state, since the first electromagnetic valve 22 is in the closed state, the first hydraulic pressure chamber 1B becomes in a sealed state (liquid-tightly sealed). However, since the second electromagnetic valve 23 is in the open state, the second hydraulic pressure chamber 1C is in communication with the reservoir 171.

When the brake pedal 10 is further depressed, the input piston 13 advances to raise the pressure in the first hydraulic pressure chamber 1B. Then, by the raised pressure, the first master piston 14 advances. It is noted that in this state, the pressure decreasing valve 41 and the pressure increasing valve 42 are not energized and accordingly, servo pressure is not controlled. In other words, the first master piston 14 advances only by the force corresponding to the operating force of the brake pedal 10 (pressure in the first hydraulic pressure chamber 1B). The volume of the servo chamber 1A increases thereby, but since the servo chamber 1A is in communication with the reservoir 171 through the regulator 44, the brake fluid is supplemented.

When the first master piston 14 advances, as similar to the "linear mode", the pressure in the first master chamber 1D and the pressure in the second master chamber 1E are increased. Then the pressure in the second pilot chamber 4E increases due to the increase of the pressure in the first master chamber 1D. Then due to the increase of the pressure in the second pilot chamber 4E, the sub piston 446 slidable moves towards the cylinder bottom surface side and at the same time, the control piston 445 is pushed by the first projecting portion 446*b* and slidably moves towards the cylinder bottom surface side. The projecting portion 445*b* is brought into contact with the ball valve 442 and the ball valve 442 is pushed thereby and moves towards the cylinder bottom surface side. In other words, the fluid communication between the first chamber 4A and the second chamber 4B is established while the fluid communication between the servo chamber 1A and the reservoir 171 is interrupted. Accordingly, the highly pressurized brake fluid from the accumulator 431 is supplied to the servo chamber 1A.

According to the "REG mode", when the brake pedal 10 is depressed with a predetermined stroke, the fluid communication between the accumulator 431 and the servo chamber 1A is established to increase the servo pressure without electrical control and the first master piston 14 advances by the servo pressure. As explained above, a highly pressurized brake fluid is supplied to the ABS 53 even under each of the electromagnetic valves is in non-energized state.

Input Piston Contact Presumption Process

Figure 3:
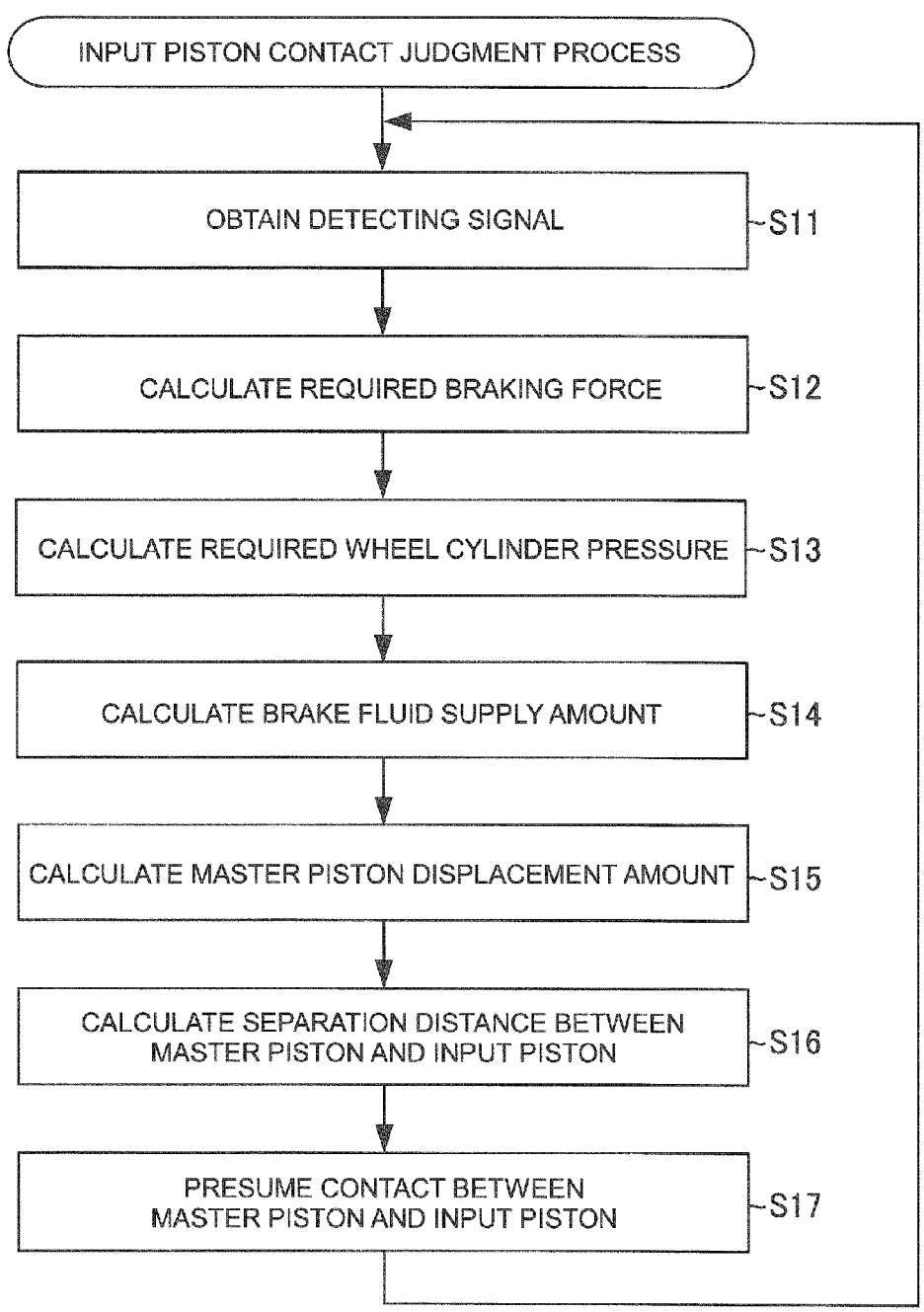
FIG. 3 is a flowchart for input piston contact presumption process which is a control program executed at the brake ECU shown in FIG. 1.

The brake ECU 6 serves also as a judging portion for judging whether the input piston 13 and the first master piston 14 are in contact with or in non-contact with (separated from) each other. One example of the judging method for judging whether the state is the contact state or the non-contact state by the brake ECU 6 will be explained with reference to the flowchart of FIG. 3. When the vehicle becomes a state that is ready for starting, then the brake ECU 6 is activated. At the step S11, the brake ECU 6 obtains the displacement amount Di of the input piston 13 from the stroke sensor 71 and obtains the reaction force pressure Pa of the first and the second hydraulic pressure chambers 1B and 1C from the pressure sensor 73 to advance the program to the step S12.

At the step S12, the brake ECU 6 calculates the "required braking force" referencing the displacement amount Di and the reaction force pressure Pa to the mapping data which represents the relationship between the required braking force and the displacement amount Di and the reaction force pressure Pa. Then the brake ECU 6, based on the obtained "required braking force", calculates the "target friction braking force" which is a target braking force set to be generated by each pressure in the wheel cylinders 541 through 544 and the program goes to the step S13. The target friction braking force can be set to the same value with the required braking force when the braking device is not used in a hybrid vehicle. In the case the braking device is used in the hybrid vehicle, the brake ECU 6 obtains a target value of a regeneration brake device "A" i.e., a "target regeneration braking force" from a hybrid ECU and then calculates the "target friction braking force" by subtracting the "target regeneration braking force" from the "required braking force".

At the step S13, the brake ECU 6 calculates a required wheel pressure Ph which acts on the wheel cylinders 541 through 544 based on the "target friction braking force". Then the program goes to the step S14.

Figure 4A:
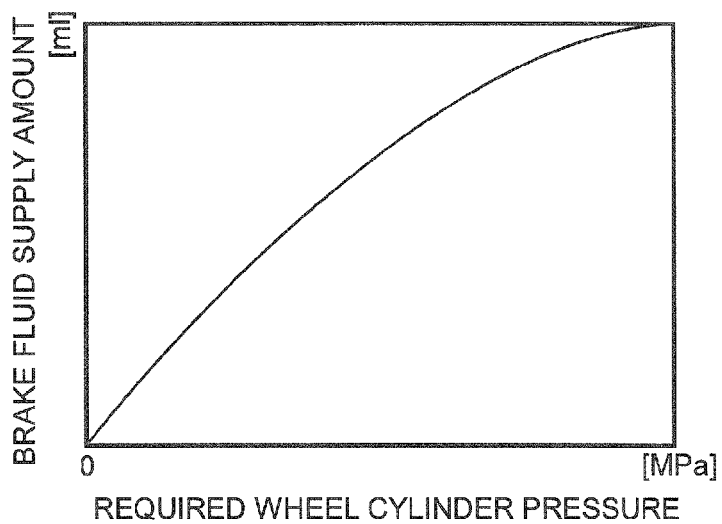
FIG. 4(A) is a mapping data showing a relationship between the required wheel pressure and the brake fluid supply amount and FIG. 4(B) is a mapping data showing a relationship between the brake fluid supply amount and the master piston displacement amount.

At the step S14, the brake ECU 6 calculates the brake fluid supply amount Fq by referencing the required wheel pressure Ph to the mapping data which represents the relationship between the required wheel pressure and the brake fluid supply amount as illustrated in FIG. 4A. It is noted that as shown in FIG. 4A, the brake fluid supply amount increases as the required wheel pressure increases. After the process at the step S14, the program goes to the step S15.

Figure 4B:
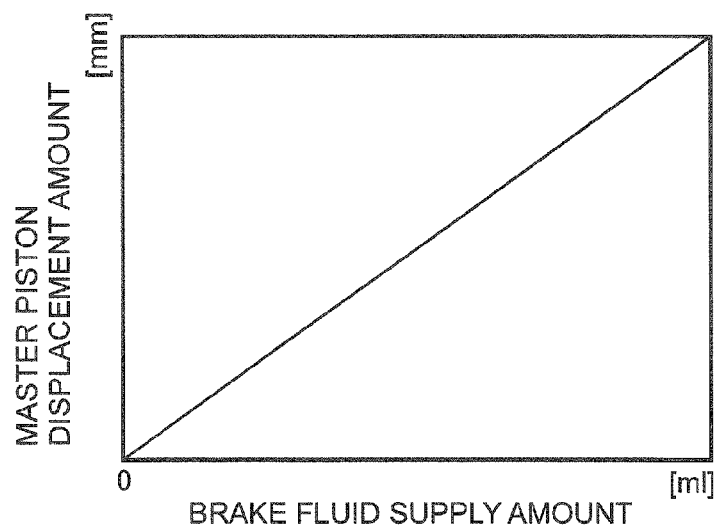

At the step S15, the brake ECU 6 calculates the displacement amount Dm of the first master piston 14 by referencing the brake fluid supply amount Fq to the mapping data which represents the relationship between the brake fluid supply amount and the displacement amount of the first master piston 14 as illustrated in FIG. 4B. It is noted that as shown in FIG. 4B, the displacement amount of the first master piston 14 increases proportionally as the brake fluid supply increases. After the process at the step S15, the program goes to the step S16.

At the step S16, the brake ECU 6 calculates the separation distance Ds between the first master piston 14 and the input piston 13 based on the calculated displacement amount Di of the input piston 13 and the displacement amount Dm of the first master piston 14. In more detail, the separation distance Ds between the first master piston 14 and the input piston 13 can be calculated by substituting the values of the displacement amount Di of the input piston 13 and the displacement amount Dm of the first master piston 14 into the following formula (1).

$$Ds = Dp - Di + Dm \quad (1),$$

Wherein,

Ds: separation distance (mm) between the first master piston 14 and the input piston 13, Dp: initial separation distance (mm) between the first master piston 14 and the input piston 13, Di: displacement amount (mm) of the input piston 13, Dm: displacement amount (mm) of the first master piston 14.

The initial separation distance Dp is a separation distance between the first master piston 14 and the input piston 13 when the brake pedal 10 is not depressed. After the process of the step S16, the program goes to the step S17.

At the step S17, the brake ECU 6 presumes whether or not the first master piston 14 and the input piston 13 are in contact with each other based on the separation distance Ds (corresponding to the distance "d" in FIG. 1) between the first master piston 14 and the input piston 13. The first judgment is presumably made that the pistons are separated (non-contact state). From the next judgment and thereafter, judgment is made using a threshold value at separation state and a threshold value at contact state (abutting) which are the different threshold values for judgments, depending on whether the last time state is judged to be the separation state or the contact state. In other words, if it was judged at the last time judgment that the state is "separation state", the brake ECU 6 judges that the separation state is maintained when the separation distance Ds of the separation state is larger than the threshold value at the separation state (0 mm), and judges that the state is the contact state when the separation distance Ds is equal to or less than the threshold value at the separation state (0 mm). On the other hand, the brake ECU 6 judges that the contact state is maintained when the separation distance Ds is smaller than the threshold value at contact state (2 mm), and judges that the state is separation state when the separation distance Ds is equal to or larger than the threshold value at the contact state (2 mm). After the process at the step S17, the program goes to the step S11.

Control for Pressure Decreasing Valve and Pressure Increasing Valve

The control by the brake ECU 6 for controlling the pressure decreasing valve 41 and the pressure increasing valve 42 in the linear mode will be explained hereinafter with an example of emergency braking operation by the operator of the vehicle. The brake ECU 6 in the hydraulic pressure FB (Feed-Back) control mode selects one of a pressure increasing mode, a pressure decreasing mode and a pressure holding mode based on the comparison of the pressure between the target hydraulic pressure (target servo pressure) corresponding to the stroke of the brake pedal 10 and the servo pressure (detected value of the pressure sensor 74), that is, the difference therebetween. The hydraulic pressure FB control is performed by sending the control signals (instruction currents) to the pressure decreasing valve 41 and the pressure increasing valve 42. The pressure increasing mode is a mode where the servo pressure is increased and the pressure decreasing mode is a mode where the servo pressure is decreased. Further, the pressure holding mode is a mode where the servo pressure is maintained.

T0~T1

As shown in FIG. 5, in the time period from the time T0 to the time T1, since the operator of the vehicle has depressed the brake pedal 10 suddenly, the input piston 13 is brought into contact with the first master piston 14 and similar to the REG mode, the input piston 13 and the first master piston 14 are moved forward by the depression force of the operator of the vehicle. By this forward movement, the master pressure and the wheel pressure are raised and at the same time the brake fluid in the first master chamber 1D is supplied to the second pilot chamber 4E via the conduits 51 and 511. Then the sub piston 446 and the control piston 445 are advanced thereby. The advancement of the control piston 445 establishes the fluid communication between the first chamber 4A and the second chamber 4B and the highly pressurized brake fluid is supplied into the servo chamber 1A to raise the servo pressure therein. Due to the increase of the servo pressure, a force is applied to the first master piston 14 to further advance the piston 14 in a forward direction.

In the hydraulic pressure FB control mode, the servo pressure has reached to the target hydraulic pressure and therefore the mode is set to the pressure holding mode. Therefore, the final instruction current to the pressure increasing valve 42 (control signal) indicates zero (0), which i.e., indicates a valve closing instruction and the final instruction current to the pressure decreasing valve 41 indicates a higher value, which, i.e., indicates a valve closing instruction. A seal current "Is" is applied to the pressure decreasing valve 41 for a predetermined time period from the time T0 to hold the pressure in the first pilot chamber.

It is noted here that the "FF current" means feed-forward current to the pressure decreasing valve 41 and the pressure increasing valve 42 and is a control signal set in response to the target hydraulic pressure. It is also noted that the "FB current" means the feed-back current to the pressure decreasing valve 41 and the pressure increasing valve 42 and is a control signal set in response to the change of the servo pressure and the difference between the target and the detected servo pressures in the hydraulic pressure FB control mode. The final instruction current is a control signal based on the FF current and the FB current and is sent finally to the pressure decreasing valve 41 and the pressure increasing valve 42. In other words, the final instruction current is the actual control signal.

At this time period from the time T0 to the time T1, since the servo pressure has reached to the target hydraulic pressure and the hydraulic pressure FB mode is in the pressure holding mode, the pressure increasing by the pressure increasing valve 42 is not performed and accordingly, the hydraulic pressure in the first pilot chamber 4D (first pilot pressure) has not reached to the hydraulic pressure level which is necessary for generating the servo pressure.

T1~T2

In the time period from the time T1 to the time T2, the wheel pressure is decreased to suppress the locking of the tire by performing the ABS control by the ABS 53. The ABS 53 pumps up the brake fluid to the master cylinder 1 side by the pump 534. Thus, the master pressure and the hydraulic pressure in the second pilot chamber (second pilot pressure) are raised and the servo pressure becomes higher than the target hydraulic pressure. Accordingly, the hydraulic pressure FB control mode is changed to the pressure decreasing mode. Then the final instruction current to the pressure increasing valve 42 is maintained to the value zero (valve closing instruction) and the control signal to the pressure decreasing valve 41 is decreased to a lower value (valve opening instruction).

T2~T3

In the time period from the time T2 to the time T3, the ABS 53 performs the ABS control to initiate increase control of the wheel pressure by establishing the fluid communication between the master cylinder 1 and the wheel cylinders 541 through 544. Then the master pistons 14 and 15 advance and at the same time the master pressure and the servo pressure drop rapidly and the FB current to the pressure decreasing valve 41 is turned to be increasing, and accordingly, the final instruction current to the pressure decreasing valve 41 turns to be in increasing instruction.

T3~T4

At the time T3, the servo pressure becomes equal to the target hydraulic pressure and the hydraulic pressure FB control mode is switched over to the pressure holding mode. The seal current "Is" is applied to the pressure decreasing valve 41 as the final instruction current for a predetermined period of time. The brake ECU 6 tries toprevent the drop of servo pressure using the first pilot pressure even when the master pressure drops. However, the first pilot pressure has not reached to the pressure level necessary for generating the servo pressure, and therefore, the servo pressure continues to be dropping and the hydraulic pressure FB control mode is changed over to the pressure increasing mode.

The final instruction current to the pressure decreasing valve 41 is maintained to a high value at a predetermined time period. The final instruction current to the pressure increasing valve 42 is increased from the value zero to a predetermined value and gradually increasing thereafter. Thus, the brake fluid is supplied to the first pilot chamber 4D, intending to increase the pressure in the first pilot chamber 4D. However, since a certain amount of an idle hydraulic fluid exists in the first pilot chamber 4D, the first pilot pressure and accordingly servo pressure is not raised until an amount of brake fluid equal to the amount of the idle hydraulic fluid is supplied thereto. In detail, the first pilot pressure would not be increased for a time period until the sub piston 446 is pushed towards and is brought into contact with the cylinder opening side end portion of the regulator 44.

T4~T5

At the time T4, the contact between the input piston 13 and the first master piston 14 is detected by the brake ECU 6. The time at which the judgement whether the state is the non-contact state, ON state, or the contact state, OFF state, is delayed by the calculation time from the time when the pistons 13 and 14 actually come into contact with each other. When the judgement is ON state, which means that the state is the contact state, the brake ECU adds a correction current to the final instruction current applied to the pressure increasing valve 42 so that the final instruction current (another control signal) becomes higher than the final instruction current (the control signal) at the judgement being the non-contact state (including the state where no judgement of contact or non-contact is made). In other words, the first pilot pressure corresponding to the final instruction current (the another control signal) to the pressure increasing valve 42 for the time period from the time T4 to the time T5 is higher than the first pilot pressure corresponding to the final instruction current (the control signal) at the time of the judgment process being at the OFF state. Thus the first pilot pressure is quickly turned to be in the pressure increasing side and accordingly, the servo pressure begins to increase.

T5~T6

The servo pressure increases and the outputting of the correction current ends at the time T5. The normal final instruction current corresponding to the FF current and the FB current is sent to the pressure increasing valve 42.

T6~T7

At the time T6, the servo pressure reaches to the target hydraulic pressure and the hydraulic pressure FB control mode is changed to the pressure holding mode.

T7~T8

During the time period from the time T7 to the time T8, as similar to the time period from the time T1 to the time T2, the ABS 53 performs the ABS control thereby decreasing the wheel pressure. At the time T7, the master pressure and the servo pressure begin to increase wherein the hydraulic pressure FB control mode is changed to the pressure decreasing mode. It is noted here that since the judgment for judging whether the state is contact state or the non-contact state is ON state, the brake ECU 6 outputs the FB current to the pressure decreasing valve 41 which is higher than the current at the time when the judgment is OFF state and sets the final instruction current to a value higher than the current value of the final instruction current when the judgment is OFF state. In other words, when the judgment is ON state, the brake ECU 6 reduces the ratio of drop of the final instruction current to the pressure decreasing valve 41 smaller than the rate of drop of the final instruction current to the pressure decreasing valve 41 when the judgement is OFF state (at the time period from time t6 to time t7 in FIG. 6). The first pilot pressure corresponding to the final instruction current (second control signal) when the judgment is ON state is higher than the first pilot pressure corresponding to the final instruction current (first control signal) when the judgment is OFF state.

T8~T9

The ABS 53 performs the ABS control to start increasing of the wheel pressure. Since the final instruction current to the pressure decreasing valve 41 is kept to be a higher value by the correction of the final instruction current upon the judgment being ON state, the drop of the first pilot pressure can be suppressed. Accordingly, the drop of the servo pressure and the master pressure can be prevented even during the wheel pressure increasing control by the ABS 53 and appropriate wheel pressure increasing control can be performed.

T9 and Thereafter

When the servo pressure becomes approximately equal to the target hydraulic pressure, the hydraulic pressure FB control mode is changed to the pressure holding mode and the seal current "Is" is applied for a predetermined time period as the "final instruction current to the pressure decreasing valve 41". Since the first pilot pressure has already reached to the pressure level that is necessary for generating the servo pressure, the drop of servo pressure can be prevented.

It is noted here that the conventional control which does not judge whether the pistons are separated or in contact will be briefly explained as a reference. As shown in FIG. 6, in the conventional control, for the time period from time t3 to time t4, a gradual increase of the final instruction current to the pressure increasing valve 42 is performed to cope with the decrease of the servo pressure. For the time period from the t1 to the time t2, similar to the case in FIG. 5, since the input piston 13 and the first master piston 14 are in contact with each other due to a sudden braking operation, the idle hydraulic fluid amount exists in the first pilot chamber 4D for the time period from the time t3 to the time t4. Accordingly, the gradual opening of the pressure increasing valve 42 would not raise both the first pilot pressure and the servo pressure. Accordingly, the master pressure and the wheel pressure are not raised and the vehicle deceleration is not increased, either.

At the ABS pressure decreasing control for the time period from t6 to t7, the final instruction current to the pressure decreasing valve 41 is largely decreased as the normal operation. At the ABS pressure increasing control, for the time period from t8 to t9, the master pressure and the servo pressure drop abruptly. For the time period from t8 to t9, the control mode once becomes the pressure holding mode, but since the correction of the control signal in the contact state is not made, the first pilot pressure drops to change the mode to the pressure increasing mode. In this pressure increasing mode, in spite of the state that the first pilot pressure is decreased due to the contact state, the final instruction current to the pressure decreasing valve 41 is set to be a small value as a normal non-contact state. Therefore, the pressure increasing operation for the first pilot pressure cannot catch up with the requirement and the increase of the servo pressure delays. Thus the gradual increase of the wheel pressure is performed.

Figure 7:
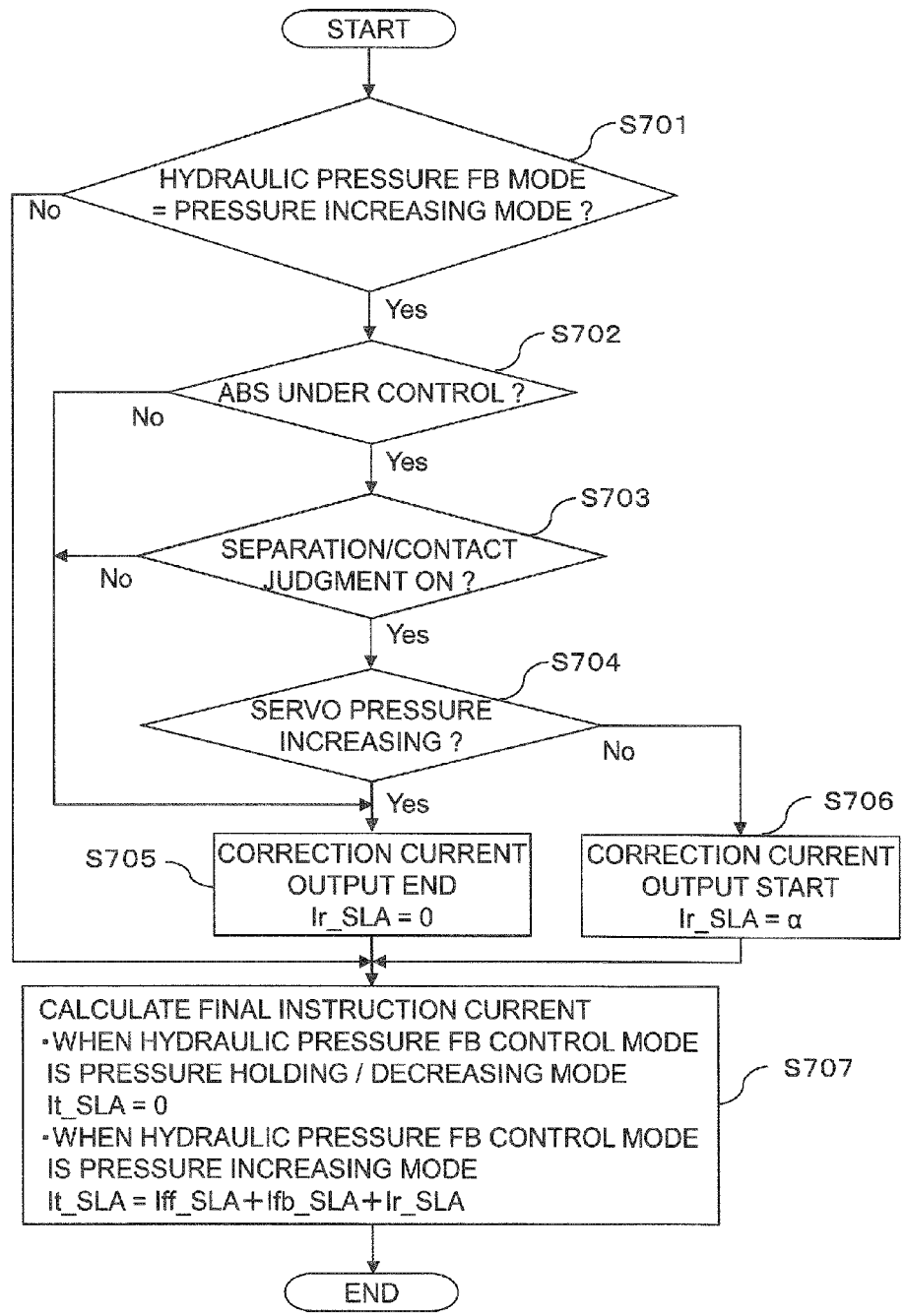
FIG. 7 is flowchart for explaining a control of the pressure increasing valve of the braking device for the vehicle according to the embodiment.

The control of the pressure increasing valve 42 by the brake ECU 6 according to the embodiment will be explained with reference to FIG. 7. As shown in FIG. 7, first, the brake ECU 6 judges whether the hydraulic pressure FB control mode is at the pressure increasing mode or not (S701) and if the brake ECU 6 judges that the hydraulic pressure FB control mode is at the pressure increasing mode (S701; YES), then further the brake ECU 6 judges whether the ABS control is executed or not (S702). If the brake ECU 6 judges that the ABS control is being executed (S702; YES), the brake ECU 6 judges whether the judgment for judging the contact or non-contact state is ON state (contact state) or not (S703). If the judgement process is at ON state (S703; YES), then the brake ECU 6 judges whether the servo pressure is increasing or not (S704).

If the brake ECU 6 judges that the servo pressure is increasing (S704; YES), the correction current Ir_SLA is set to the value zero (0) (S705). On the other hand, if the brake ECU 6 judges that the servo pressure is not increasing (S704; NO), the correction current Ir_SLA is set to a predetermined value α (α≠0) (S706) and the final instruction current is calculated (S707). When the hydraulic pressure FB control mode is the pressure increasing mode, the calculation thereby is made based on the following formula, in which:

$It\_SLA$(final instruction current)=$Iff\_SLA$(FF current)+$Ifb\_SLA$(FB current)+$Ir\_SLA$(correction current).

On the other hand, when the hydraulic pressure FB control mode is the pressure decreasing mode or the pressure holding mode (S701: NO), the final instruction current It_SLA become zero (It_SLA=0) (S707). Further, when the ABS control is not executed (S702: NO), or when the judgment for judging the contact or non-contact state is OFF state (S703: NO), the correction current is determined to be zero (0) (S705).

The control of the pressure decreasing valve 41 by the brake ECU 6 according to the embodiment will be explained with reference to FIG. 8. As shown in FIG. 8, first, the brake ECU 6 judges whether the hydraulic pressure FB control mode is in the pressure decreasing mode or not (S801) and if the brake ECU 6 judges that the hydraulic pressure FB control mode is in the pressure decreasing mode (S801; YES), then the judgment timer is cleared (S802). Then the FB current (Ifb_SLA) of the pressure decreasing valve 41 is calculated (S803). The judgment timer is for defining the time while the seal current "Is" is energized.

Then, the brake ECU 6 judges whether the ABS control is executed or not (S804). If the brake ECU 6 judges that the ABS control is being executed (S804; YES), the brake ECU 6 judges whether the judgment for judging the contact or non-contact state is ON state or not (S805). If the judgement is ON state (S805; YES), the FB current is multiplied by a predetermined coefficient "K" (K<1) (S806). The calculation for the final instruction current to the pressure decreasing valve 41 is made based on the following formula, in which: It_SLR (final instruction current)=Iff_SLR (FF current)+Ifb_SLR (FB current). (S807). When the brake ECU 6 judges that the ABS control is not being executed (S804: NO), or when the judgement for judging the contact or non-contact state is OFF state (S805: NO), the final instruction current is calculated without multiplication of the FB current by the coefficient K (S807).

On the other hand, when the hydraulic pressure FB control mode is the pressure increasing mode or the pressure holding mode (S801: NO), the brake ECU 6 judges whether the last (previous) time hydraulic pressure FB control mode was the pressure decreasing mode or not (S808). If the brake ECU 6 judges that the last time hydraulic pressure FB control mode was the pressure decreasing mode (S808: YES), the judgment timer is started to be counting up (S810). Then, the final instruction current to the pressure decreasing valve 41 is calculated based on the following formula (S811):

$It\_SLR=Iff\_SLR+Is$(seal current).

When the last time control mode is judged to be "not the pressure decreasing mode" (S808: NO), the brake ECU 6 judges whether the judgment timer is less than the value T or not (S809). If the brake ECU 6 judges that the judgment timer is less than the value T (S809: YES), the judgment timer is counted up (S810) and the seal current "Is" is energized (S811). When the brake ECU 6 judges that the judgment timer is equal to or more than the value T (S809: NO), the final instruction current to the pressure decreasing valve 41 is calculated based on the following formula (S812):

$It\_SLR=Iff\_SLR+Ih$(holding current).

The holding current "Ih" is an auxiliary current for guaranteeing the FF current. It is noted that as an example of reducing the ratio of the FB current, FB gain can be reduced.

According to the vehicle braking device according to the embodiment, when the input piston 13 and the first master piston 14 are in contact (contact state) due to, for example, an emergency braking operation and the servo pressure is generated according to the master pressure introduced to the second pilot chamber as the second pilot pressure, a judging portion which judges whether the state is the contact or non-contact state judges and detects such contact state and a linear control (controlling of the pressure decreasing valve 1 and the pressure increasing valve 42) different from the normal operation in the non-contact state regarding to the wheel pressure increase/decrease control corresponding to the ABS control or the like is executed.

In detail, according to the embodiment, when the contact state is detected and the ABS control is executed, the pressure decreasing valve 41 and the pressure increasing valve 42 are controlled so that the first pilot pressure becomes higher than the pilot pressure in the normal operation (when the judgement is OFF state). Thus, when the state is changed from the contact state to the non-contact state and the main generation of the servo pressure is changed from being generated according to the master pressure introduced to the second pilot chamber (second pilot pressure) to being generated according to the linear pilot pressure generated in the first pilot chamber (first pilot pressure), the first pilot pressure is controlled to be higher than the first pilot pressure at the normal operation in the non-contact state. This can suppress the influence of the ineffective fluid amount and a quick adjustment of the linear pilot pressure (first pilot pressure) can be realized. Thus, the quick adjustment of the servo pressure and the master pressure can be realized. In other words, the responsiveness of the control to the servo pressure can be highly maintained. According to the invention, the value of the first pilot pressure generated in response to a control signal (second control signal) when the judging portion judges that the state is the contact state becomes higher than the value of the first pilot pressure generated in response to a control signal (first control signal) when the judging portion judges that the state is the non-contact state under the same vehicle state as that at the time when the judging portion judges that the state is contact state. The "same vehicle state" in this invention means one randomly selected vehicle state and is described for the purpose of comparison between the control signal at the non-contact state and the control signal at the contact state under the same one random vehicle state.

Further, the brake ECU 6 is set to change the correction current "It_SLA and the predetermined coefficient "K" in response to the control state of the ABS 53. In other words, the correction current "It_SLA and the predetermined coefficient "K" are changed in response to the number of the wheel cylinders 541 through 544 (corresponding to "braking state of the vehicle") which pressures are adjusted by the ABS 53. It is set such that the more the number increases, the larger the values of the correction current "It_SLA and the predetermined coefficient "K" become. The pressure fluctuation becomes large as the number of the wheel cylinders, which pressures are adjusted by the ABS 53 increases. Accordingly, by raising the value of the correction current It_SLA and the value of the predetermined coefficient "K", such pressure fluctuation can be prevented or minimized.

The invention claimed is:
1. A braking device for a vehicle, comprising:
a master cylinder;
an output piston slidably provided in the master cylinder and varying the volume of a master chamber by being driven by a force corresponding to a hydraulic pressure in a servo chamber which is defined by the master cylinder;

an input piston slidably provided in the master cylinder at a rearward of the output piston and defining a first hydraulic pressure chamber to be filled with a brake fluid, with the output piston, the input piston being operable in association with an operation of a brake operating member;

an inter-chamber passage which connects a second hydraulic pressure chamber, a volume of which is decreased as the output piston moves forward and the first hydraulic pressure chamber;

a mechanical servo pressure generating device which outputs a hydraulic pressure at an output port, the hydraulic pressure which corresponds to a hydraulic pressure which is a higher hydraulic pressure between a hydraulic pressure inputted to a first pilot chamber and a hydraulic pressure inputted to a second pilot chamber;

a first route which connects the servo chamber and the output port;

a hydraulic pressure detecting device which detects a hydraulic pressure in the first route;

a pilot pressure generating device which generates a pilot pressure corresponding to a control signal inputted thereto in the first pilot chamber; and a second route which connects the master chamber and the second pilot chamber, characterized in that the braking device further includes:

a judging portion which judges whether the input piston and the output piston are in contact with or separated from each other; and a control portion which outputs a control signal to the pilot pressure generating device so that the hydraulic pressure detected by the hydraulic pressure detecting device becomes a target value corresponding to a vehicle state when the judging portion judges that the input piston is not in contact with the output piston, and which outputs another control signal to the pilot pressure generating device at a time when the judging portion judges that the input piston is in contact with the output piston, the pilot pressure generated by the pilot pressure generating device according to said another control signal being higher than the pilot pressure generated by the pilot pressure generating device according to the control signal when the judging portion judges that the input piston is not in contact with the output piston under the same vehicle state as that at the time when the judging portion judges that the input piston is in contact with the output piston.

2. The braking device for a vehicle according to claim 1, further comprising:

an actuator provided for introducing the brake fluid into the master chamber, wherein the control portion outputs said another control signal at a time when the judging portion judges that the input piston is in contact with the output piston and the brake fluid is introduced into the master cylinder, the pilot pressure generated by the pilot pressure generating device according to the second control signal being higher than the pilot pressure generated by the pilot pressure generating device according to the control signal when the judging portion judges that the input piston is not in contact with the output piston under the same vehicle state as that at the time when the judging portion judges that the input piston is in contact with the output piston and the brake fluid is introduced into the master cylinder.

3. The braking device for a vehicle according to claim 1, wherein, the actuator is provided for discharging the brake fluid from the master chamber and wherein the control portion outputs said another control signal at a time when the judging portion judges that the input piston is in contact with the output piston and the brake fluid is discharged from the master cylinder, the pilot pressure generated by the pilot pressure generating device according to said another control signal being higher than the pilot pressure generated by the pilot pressure generating device according to the control signal when the judging portion judges that the input piston is not in contact with the output piston under the same vehicle state as that at the time when the judging portion judges that the input piston is in contact with the output piston and the brake fluid is discharged from the master cylinder.

4. The braking device for a vehicle according to claim 1, wherein, the control portion calculates and outputs a corrected control signal at a time when the judging portion judges that the input piston is in contact with the output piston, the corrected control signal being calculated by correcting the control signal outputted when the judging portion judges that the input piston is not in contact with the output piston in such a manner that the pilot pressure generated by the pilot pressure generating device according to the corrected control signal is higher than the pilot pressure generated by the pilot pressure generating device according to the control signal when the judging portion judges that the input piston is not in contact with the output piston under the same vehicle state as that at the time when the judging portion judges that the input piston is in contact with the output piston, and a correcting amount of the control signal is varied in response to a braking state of the vehicle.

5. The braking device for a vehicle according to claim 4, further comprising:

a hydraulic pressure control device provided between the master chamber and each of a plurality of wheel cylinders for controlling a hydraulic pressure in the each of the wheel cylinders by introducing the brake fluid at a wheel cylinder side into the master chamber, wherein the control portion changes the correcting amount based on a number of wheel cylinders which are the subject of control of the hydraulic pressure control device among the plurality of wheel cylinders as the braking state of the vehicle.

6. The braking device for a vehicle according to claim 4, further comprising:

a hydraulic pressure control device provided between the master chamber and each of a plurality of wheel cylinders for controlling a hydraulic pressure in the each of the wheel cylinders by discharging the brake fluid from the master chamber to a wheel cylinder side, wherein the control portion changes the correcting amount based on a number of wheel cylinders which are the subject of control of the hydraulic pressure control device among the plurality of wheel cylinders as the braking state of the vehicle.

\* \* \* \* \*